Patented Dec. 3, 1929.

1,738,089

UNITED STATES PATENT OFFICE

BENJAMIN F. WALLACE, OF BROOKLYN, NEW YORK

PARIS GREEN INSECTICIDE

No Drawing.  Application filed February 9, 1925. Serial No. 8,036.

This invention relates to improvements in insecticides and has for its particular objects the production of a product which includes Paris green in its combination and which will float indefinitely for long periods of time on water, such product being particularly adapted for the destruction of mosquito larvæ.

I am aware that it has heretofore been proposed to distribute Paris green over the surface of stagnant water with a view to destroying the mosquito larvæ when they rose to the surface to breathe but owing to the specific density of such material, it was not sufficiently buoyant to remain on the surface sufficiently long and effective destruction of the mosquito larvæ, due to the settling of the Paris green, could not be accomplished.

This was also true when certain inert filling materials were mixed with Paris green, as owing to the fact that such fillers or diluents were of a greater density than water, they too, would settle out and the effectiveness of the mixture would be destroyed.

My investigations have led to the discovery that a highly effective mosquito exterminator can be produced by the impregnation of the filler employed in the insecticide and/or the Paris green or insecticide material employed with relatively small quantities of a highly penetrative and a relatively permanent waterproofing agent without deleteriously affecting the insecticidal properties of the insecticide product, and that such product is peculiarly adapted for the destruction of mosquito larvæ, because of the fact that a film of the same can be maintained for long periods of time on the surface of the water which forms the feeding place of the mosquito larvæ.

In carrying out my invention, I preferably proceed as follows:—

Approximately 4% of Paris green is intimately incorporated with 96% of light porous, fluffy calcium carbonate, which carbonate compound is sufficiently light to float on water when water-proofed in the manner hereinafter described, for example: a calcium carbonate which when tightly packed, i. e. mechanically packed or tamped, in an ordinary large sugar barrel weighs but 200 lbs. per barrel, and said mixture of Paris green and calcium carbonate is submerged in a boiling solution of a water-proofing substance, for example: stearic acid in the proportions of approximately ½% to 1% of stearic acid to 99½% to 99% of the aforesaid mixture. The mixture is allowed to stand until the water-proofing substance has thoroughly penetrated throughout the solid mass treated and any water in the mass is evaporated either in vacuo or under atmospheric pressure.

After the removal of any water, the residual mixture is subjected to a prolonged heating operation, for example, for a period of 45 minutes at a temperature sufficient to effectively water-proof the same as evidenced by test portions taken from time to time. When a test portion shows that the mass so tested will virtually float indefinitely on water, whereas the untreated mass will rapidly sink therein, the heating is discontinued and the product is ready, when cooled, to be packaged and shipped.

The mixture so obtained is then reduced to a finely pulverized condition in a suitable mill or otherwise, preferably to such extent that the particles of the same approximately 200 mesh in size.

While I prefer to employ stearic acid, because of the fact that it is a digestible fat and therefore subject to decomposition when absorbed into the digestive tract of the larvæ, nevertheless, other water-proofing substances, such as tallow, lard oil, cocoa butter and the like may also be employed. Also the proportions of the water-proofing substances so employed may, of course, vary from the proportions herein given of ½% to 1%, but the aforesaid proportions are found to impart excellent results.

Preferably the temperature to which the mixture is heated in the heat treatment referred to, ranges between 220° C. to 240° C., but the same should be sufficient to render the material water-proof and water repellent and also to cause the water-proofing material to thoroughly penetrate into the insecticide and the diluent or filler.

While I prefer a light, fluffy calcium carbonate of the type which when so waterproofed will float on water, other light fluffy fillers, such as for example magnesium carbonate or other compounds capable of effective substitution for such calcium carbonate can be employed without departing from the spirit of the invention, as set forth in the appended claims.

While I preferably employ 4% of an insecticide such as Paris green, obviously the percentages may vary below or above this amount to suit the particular requirements in the locality where the product is employed and other insecticides, such as for example, calcium arsenate or other like insecticides which are suitable for the requirements of the user, may be employed without departing from the spirit of my invention as covered in the appended claims.

While preferably no solvent is required in the production of the insecticide or the larvicide product herein described, with the reason that under heat and constant stirring the small percentage of stearic acid employed will distribute itself throughout either in fine, light, porous, fluffy carbonate as it comes from the drier, or throughout the wet mass of carbonate as it comes from the ordinary filter press which usually carries from 60% to 70% of water. If the wet process is employed, it is preferably to first disintegrate the stearic acid into fine particles and stir the same into the cool wet slurry or soup of carbonate and water as it comes from the filter press. Under the influence of the heat and the steam generated, the stearic acid becomes uniformly and homogeneously distributed through the entire mass. The waterproofing action does not commence until after all the steam is evaporated and the heat has been raised to a temperature considerably above the boiling point of the water, for example, from 200° C. and upwards.

When performing the dry process, the stearic acid is first finely shaved and then mixed into the dry fluffy mass of carbonate whereupon a reaction occurs very rapidly and at a considerably lower heat, say for example: around 140° C. to 160° C., than is usually employed when operating in accordance with the above described wet method.

In certain cases it may be preferred from the standpoint of economy and other reasons to water-proof the calcium carbonate with the stearic acid or like water-proofing agent employed before mixing the Paris green therewith. In such cases it will be found that after the water-proofing of the carbonate or other diluent or filler has been completed, the heat can be shut off and prior to the cooling of the mixture the Paris green in a finely divided condition can be mixed into the same by constant stirring over a period of 10 to 15 minutes.

It has been ascertained that there will be no settling of the Paris green from such a product after the same has been floating on water for some twenty-four hours. Apparently there is a penetration of the Paris green by the fumes from the hot mass into which it is introduced or raises the temperature to which the mass is heated when the Paris green is introduced thereinto to cause the infiltration or penetration of the waterproofing agent into the insecticide or the Paris green particles.

Having thus described my invention, what I claim and desire to obtain by Letters Patent of the United States is:

1. A larvicide containing less than 5% of Paris green, less than 2% of digestible fatty animal acid and in excess of 90% of light, fluffy, calcium carbonate, the same being homogeneously incorporated together and the particles of the mixture being water-proof, water repellent and capable of floating for long periods of time on water.

2. A larvicide comprising 4 parts of Paris green and 96 parts of calcium carbonate and a small proportion of a water-proofing substance in the proportions of about one part of such water-proofing substance to 99 parts of the other two ingredients, and said larvicide being water-proof and water repellent and capable of floating for long periods of time on water.

3. A larvicide containing less than 5% of Paris green, less than 2% of digestible fatty animal acid and in excess of 90% of light, fluffy, inert filler, the same being homogeneously incorporated together and the particles of the mixture being water-proof, water repellent and capable of floating for long periods of time on water.

Signed at Ambler, in the county of Montgomery and State of Pennsylvania, this 5th day of February, 1925.

BENJAMIN F. WALLACE.